US008232785B2

(12) United States Patent
Sun

(10) Patent No.: US 8,232,785 B2
(45) Date of Patent: Jul. 31, 2012

(54) SYSTEM AND METHOD USING A CURRENT MIRROR TO PROGRAM AN OUTPUT VOLTAGE AND CURRENT

(75) Inventor: Liming Sun, Tustin, CA (US)

(73) Assignee: IGO, Inc., Scottsdale, AZ (US)

(*) Notice: Subject to any disclaimer, the term of this patent is extended or adjusted under 35 U.S.C. 154(b) by 1113 days.

(21) Appl. No.: 12/152,443

(22) Filed: May 14, 2008

(65) Prior Publication Data

US 2009/0134852 A1 May 28, 2009

Related U.S. Application Data

(63) Continuation-in-part of application No. 11/986,750, filed on Nov. 26, 2007.

(51) Int. Cl.
*G05F 1/00* (2006.01)
(52) U.S. Cl. ........................... 323/281; 323/284
(58) Field of Classification Search .......... 323/265–271, 323/273–285; 174/113 R; 340/870.39, 636.12, 340/636.13, 636.15, 660, 664; 330/278, 330/279, 282, 284, 288, 291, 292, 293
See application file for complete search history.

(56) References Cited

U.S. PATENT DOCUMENTS

| 6,836,101 | B2* | 12/2004 | Lanni | 323/274 |
| 7,193,398 | B2* | 3/2007 | Lanni | 323/274 |
| 7,365,524 | B2* | 4/2008 | Lanni | 323/274 |
| 8,035,254 | B2* | 10/2011 | Djenguerian et al. | 307/103 |
| 8,093,875 | B2* | 1/2012 | Sun | 323/281 |
| 2005/0248391 | A1 | 11/2005 | Itoh | |

FOREIGN PATENT DOCUMENTS

| JP | 07-104870 | 4/1995 |
| JP | 2005-165924 | 6/2005 |
| JP | 2008-034978 | 2/2008 |

OTHER PUBLICATIONS

PCT International Search Report and Written Opinion issued Dec. 18, 2009 for PCT/US2009/043818, 11 pages.
PCT; International Preliminary Report on Patentability dated Nov. 25, 2010 in Application No. PCT/US2009/043818.

* cited by examiner

*Primary Examiner* — Richard V Muralidar
(74) *Attorney, Agent, or Firm* — Snell & Wilmer L.L.P.

(57) ABSTRACT

A programmable AC/DC or DC/DC power supply adapted to compensate for voltage drop in a cable extending to a portable electronic device. The invention reduces the number and size of cable wires and tip components needed to remotely control an output voltage level and an output current limit. The voltage and current programming components are outside the compensation feedback loop.

14 Claims, 2 Drawing Sheets

SYSTEM AND METHOD USING A CURRENT MIRROR TO PROGRAM AN OUTPUT VOLTAGE AND CURRENT

REFERENCE TO RELATED APPLICATIONS

This application is a Continuation-In-Part of co-pending U.S. patent application Ser. No. 11/986,750, entitled "SYSTEM AND METHOD FOR CABLE RESISTANCE CANCELLATION," filed Nov. 26, 2007, the teachings of which are incorporated herein by reference.

FIELD OF THE INVENTION

The present invention is generally related to circuits for programming power converter output voltage and/or current provided to portable electronic devices.

BACKGROUND OF THE INVENTION

Power converters/adapters are typically used to charge and/or power portable electronic devices. These converters may provide a programmable voltage and/or current to the target device.

Prior art converters/adapters architectures fail to provide for compensating voltage drops in the output cable extending between the converter/adapter and the target device. This meant that output cables had to be sized with large AWG wire to minimize the IR drops and that open circuit (no load) output voltage had to be programmed high to minimize the effects of the drops. Also, output cables had to be limited to a maximum length for a given wire gauge so the drops at high curl did not become excessive.

Some prior art tips coupled between the cable and target device accommodate for cable drops, but this solution uses 2 more wires in the cable and tip to achieve the correction, as shown in FIG. 1. A single wire solution would have only compensated for half the drop passively and would have required an active stage to compensate for the entire drop on the positive and negative leads. The active compensation would have placed a length restriction on output cable as well.

The Voltage programming used a resistor in the tip that was connected in parallel with a voltage sampling potentiometer chain in the converter/adapter (base unit). This tip resistor shared a common ground with the high current ground return, so any load transients in the cable ground lead were transmitted back to the base unit and undesirably affected the output voltage.

The voltage programming was limited to a pre-set minimum voltage defined by the reference in the base unit. This meant that no passive tip could force the base unit output voltage below the preset minimum (thus, no ability to upgrade the power supply to operate over a wider voltage range other than changing the base unit).

The voltage programming resistor in the tip was included in the overall feedback loop along with the cabling from the base unit to the programming resistor. This puts a portion of the feedback loop outside the base unit, making loop compensation more difficult.

In this example of FIG. 1, note the $I_L$ load current flows through the ground path shared by resister Rvset. Noise or transients on this ground, or picked up by the Vsense line, cannot be filtered by the addition of bypass capacitors (across resistor $R_2$ or resistor Rvset) as this would place an extra low frequency pole on integrator U1 outside its local feedback loop. This external low frequency pole would make the feedback loop compensation difficult and degrade the transient response of the base unit. Also, the distributed capacitance of the cable itself produces a similar pole at higher frequencies, again contributing to problems in compensating the feed back loop.

SUMMARY OF INVENTION

The present invention achieves technical advantages as a programmable AC/DC or DC/DC power supply adapted to compensate for voltage drop in a cable extending to a portable electronic device. The invention reduces the number and size of cable wires and tip components needed to remotely control an output voltage level and an output current limit. The voltage and current programming components are outside the compensation feedback loop.

DETAILED DESCRIPTION OF THE PRESENT INVENTION

The present invention addresses all the problems of the prior approaches by fundamentally changing the way both voltage and current limit are set by the tip.

The advantages of the new architecture are listed below:

1. The number of wires in the output cable is reduced to 5. Two of the wires are the same small AWG for current carrying and three wires are smaller with only signal voltages and currents. The base unit interface has 5 pins and the tip interface connector has 4 pins.

2. The voltage drops in the cable are 100% compensated for by the addition of a single 5th wire in the cable and 2 resistors in the base unit.

3. The output cable can be thinner since the voltage drop in the cable is compensated in the base unit (this advantage must be balanced with the CEC and EnergyStar efficiency requirements).

4. The cable voltage drop compensation is independent of cable length and wire gauge and can reduce the error due to voltage drops by a factor of 100 or more.

5. The tip components that program the output voltage and current are now completely outside the feedback loop so loop compensation is simplified and cable noise can be bypassed without creating extra feedback poles.

6. The output voltage range of a properly designed base unit can be programmed from its maximum rated output all the way down to 0.0 volts with passive components in the tip.

7. High currents in the power or ground leads do not affect the loop transient response and have minimal affect on the output voltage programming.

Figure 1:
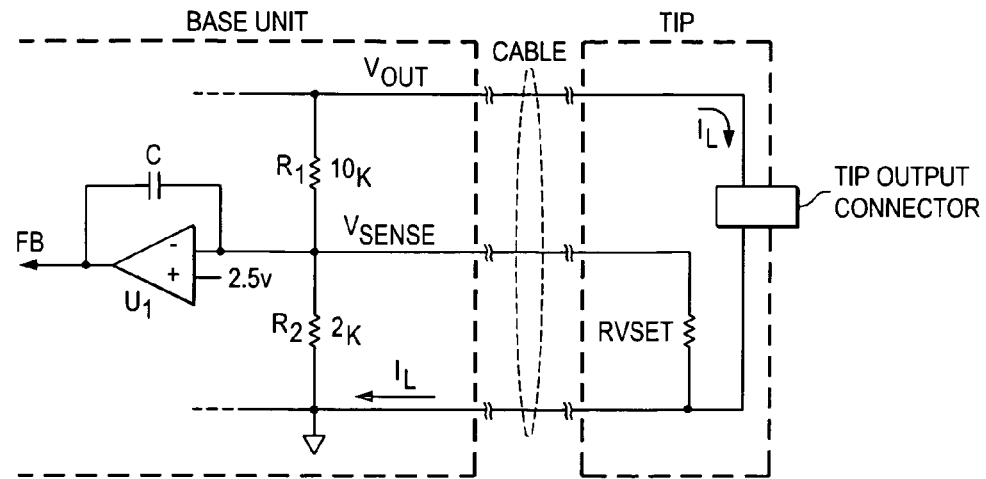
FIG. 1 is a diagram of a prior art passive resistor tip architecture.
Figure 2:
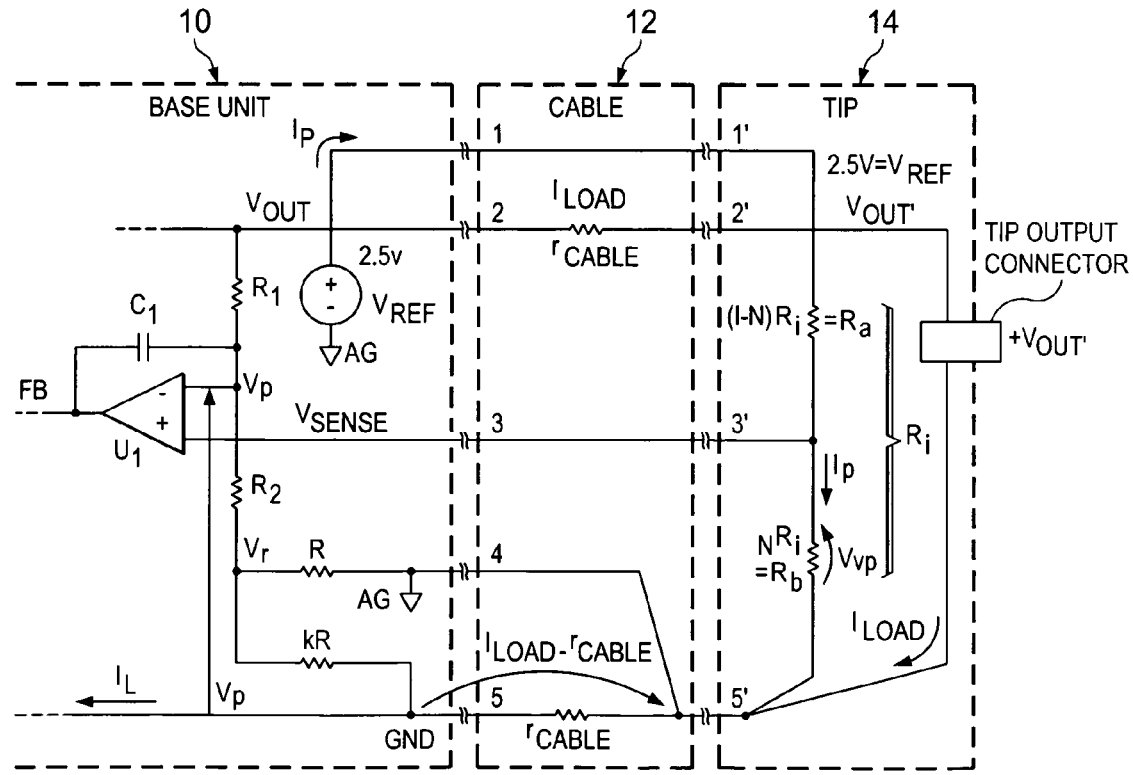
FIG. 2 is a diagram of one preferred embodiment according to one aspect of the present invention showing voltage programming.

In FIG. 2 there are three functional circuits that will be discussed. They are the base Unit 10, cable 12 and tip 14.

Base Unit

The base unit 10 contains the standard voltage comparator/integrator amplifier $U_1$ with feedback at the inverting input from the internal $V_{out}$ voltage signal. The $V_{out}$ feedback is attenuated by the resistor divide network of resistors $R_1$ and $R_2$. The other input to this amplifier is from a resistor divider in the tip. This tip resistor divider sets the output voltage for the tip output connector.

Also in the base unit is a voltage reference, $V_{ref}$, that is used to provide a current to the tip 14 in order to establish 2.5 v at the top of the tip resistor divider. This current will vary as discussed later based on the total value of the tip resistor divider.

Additionally in the base unit is a second resistor divider composed of voltage compensation resistors R and kR. These resistors R and kR provide the voltage compensation for the Cable 12 voltage drops as output load current varies. They resistors are typically low resistance value 1% resistors.

Note that the voltage drop compensation resistors R and kR are connected across the AG analog ground and the internal power ground GND. This connection advantageously provides the sampling of the cable voltage drop that allows the compensation to work.

Cable

The Cable connection 12 from the base unit 10 to the tip 14 includes 5 wires on the base side and 4 wires on the tip side. Pins 1 and 5 are heavy duty current carrying pins and the rest of the pins are low current signal pins. Note that a Kelvin connection is made in the Cable at the Tip end from pin 4 to pin 5.

Advantageously, using the voltage compensation resistors R and kR, the effects of the voltage drop in the cable 12 in both directions is completely eliminated. This would seem to imply that the usual heavy gauge wire that is used in the power leads could be reduced significantly to make the cable 12 smaller. Care must be used in sizing the power leads in the cable so that the loss in cable does not degrade the overall adapter and cable efficiency so much that the CEC and EnergyStar requirements cannot be met. Also, any cable voltage drop compensation is made up in the base 10 itself with a higher $V_{out}$ voltage. This means the output voltage range of the base 10 must take this higher compensating output voltage into account in the circuit and magnetics design.

Tip

The tip contains the two resistors used to set both the output voltage and output current limiting. The current limiting is set by computing the total value ($R_i$) of the two resistors in the resistor divider made up of $nR_i$ and $(1-n)R_i$. The output voltage of the tip is set by controlling the ratio of the two resistors by the factor n, where n<1.

Programming the $V_{OUT}$

The voltage programming circuit for the base unit is shown in FIG. 2 and will now be discussed.

In this new architecture, according to the present invention, the voltage and current limit programming share a common resistance in the tip 14 labeled $R_i$. The total value of $R_i$ defines the current limit point, and the ratio of the upper and lower resistors $R_a$ and $R_b$ that make up $R_1$ define the adapter output voltage.

For one illustration of voltage programming, the voltage at the top of resistor $R_a$; will be assumed to be equal to an internal base reference called $V_{ref}$ equal to 2.5 volts. As will be shown, the value of voltage $V_{ref}$ can be changed as long as the values of resistors $R_1$, $R_2$, R and kR are changed as well.

To program the tip output voltage $V_{out'}$ (compensated voltage delivered to the tip output pins) the following equation is used:

$$Vout' = \frac{(R1 + R2)}{R2} \cdot (2.5v) \cdot n \qquad \text{Equation 1}$$

Where $R_1$ and $R_2$ are fixed by the architecture and the variable n defines the output voltage. Referring to FIG. 2, resistor $R_1$ is set to 102 KΩ and $R_2$ to 11.3 KΩ.

Note: The R1 and R2 values chosen are the nearest 1% E96 values that produce a voltage division ratio closest to 10. In this case the 102 KΩ and 11.3 KΩ give a ratio of 10.026549. For the purpose of this derivation that number will be rounded down to 10.

The choice of 10 for a ratio is made so that in case of a loss of sense ground in the tip, the maximum output voltage for n=1 would be limited to 25 v. This would not exceed the typical over voltage protection level of 28 volts on most power supplies.

This yields the following equation:

$$Vout=10.(2.5\,v).n \qquad \text{Equation 2}$$

To produce an output voltage from 12 volts to 24 volts the variable n must take on values from 0.48 to 0.96, respectively. This n value is independent of the total value of $R_i$ in the tip.

The compensation resistors R and kR are controlled by the $R_1$ and $R_2$ values. The resulting values for R and kR are 14.7Ω and 118Ω, respectively. These values are chosen to be low so they do not appreciably affect the voltage at the junction of $R_1$ and $R_2$.

The full mathematical derivation of the compensation network will be discussed shortly.

Programming the $I_{limit}$

Figure 3:
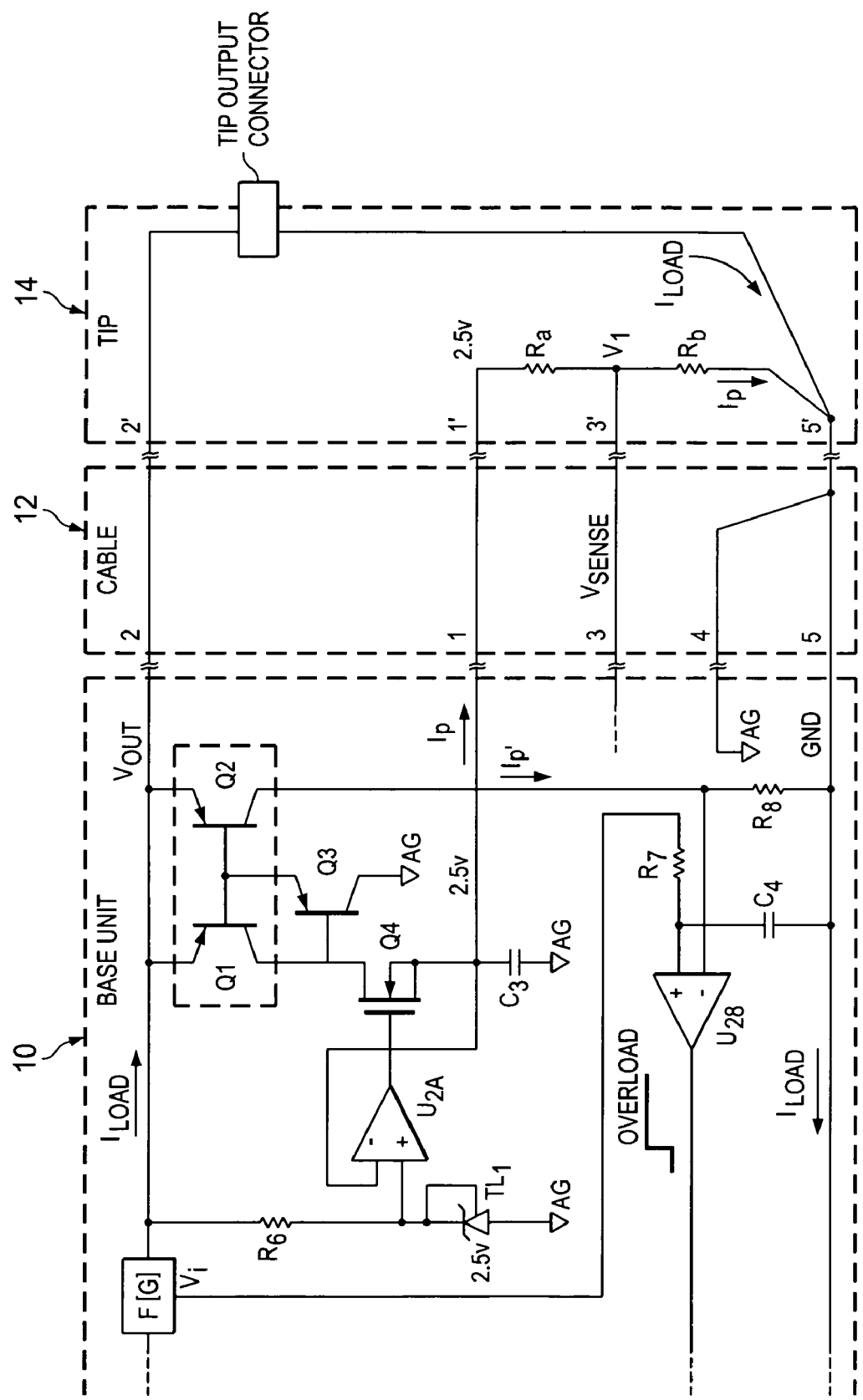
FIG. 3 is a diagram of a method of programming output current in accordance with an exemplary embodiment of the present invention.

Referring to FIG. 3, there is shown the current programming feature of the invention.

The limiting current is set by the total value of $R_i$, where $R_i$ is defined by:

$$Ri = \frac{Vref \cdot G^{-1}}{I_{limit}} \qquad \text{Equation 3}$$

Where for the circuit in FIG. 3 shows $V_{ref}=2.5$ v, G=100 uA/A, and $R_i=R_a+R_b$.

The G term defines the transfer function of the current mirror composed of $Q_1$-$Q_4$. This transfer function is fixed within the architecture, but the $V_{ref}$ conversion gain of the current mirror defined by $R_8$ and the gain F[G] of the current sensor on the base unit can all be variables as long as the G term remains at 100 uA/A.

Tip Programming

The tip current programming is achieved by first by selecting the value of $R_i$ that gives the desired $I_{limit}$ from Equation 3, then the value of n from Equation 2 that defines the output voltage at the tip is selected. This n value defines the ratio of $R_a$ to $R_b$ in the tip.

EXAMPLE

This example demonstrates the development of the formulas for the cable voltage drop compensation provided by resistors R and kR, in view of FIG. 2. Also, the dependency of R and kR on $R_1$ and $R_2$ is shown.

On the negative input of $U_1$ a voltage $V_p$ is developed from $V_{out}$ and the network of $R_1$, $R_2$, R, kR and the return load current $I_L$ flowing in one leg of the output cable 12 between pins 5' and 5. The purpose of the compensation network is to sample the current ($I_{load}$) returning from the load, convert that sampled current into a voltage ($I_{load}$*rcable), and apply a portion of that voltage to responsively raise the voltage $V_p$ proportional to the load current. Advantageously, by raising $V_p$, the $V_{out}$ voltage will be correspondingly raised to offset the voltage drop in the output cabling. The equations for $V_{out}$ and $V_p$ are derived below and the subsequent compensation of the tip voltage $V_{out}$ for cable drops due to load current $I_{load}$ is shown.

Please refer to FIG. 2 above $$Vp = m \cdot (Vout - Vr) + Vr, \text{ where } m = \frac{R2}{R1 + R2} \quad \text{Equation 1}$$

When the system is in balance, the negative and positive terminals of U1 are equal and this leads to:

$$Vp = m \cdot (Vout - Vr) + V1 = Vvp + Iload \cdot Rcable \quad \text{Equation 2}$$

Note that Vr is relative to the internal GND point and Vvp is relative to the pin 5' ground in the tip.

Substituting for m in Equation 1:

$$Vp = \frac{R2}{R1+R2} \cdot Vout + Vr \cdot \left(1 - \frac{R2}{R1+R2}\right) \quad \text{Equation 3}$$

But, $1 - \frac{R2}{R1+R2} = \frac{R1}{R1+R2}$, thus $$Vp = \frac{R2}{R1+R2} \cdot Vout + Vr \cdot \frac{R2}{R1+R2} \quad \text{Equation 4}$$

And, $Vr = \frac{kR}{R + kR} \cdot Iload \cdot Rcable$

Substituting for Vr in Equation 4:

$$Vp = \frac{R2}{R1+R2} \cdot Vout + \frac{R1}{R1+R2} \cdot \left(\frac{kR}{R+kR} \cdot Iload \cdot Rcable\right) \quad \text{Equation 5}$$

And from Equation 2, Equation 5 becomes:

$$Vp = \frac{R2}{R1+R2} \cdot Vout + \frac{R1}{R1+R2} \cdot \left(\frac{kR}{R+kR} \cdot Iload \cdot Rcable\right) \quad \text{Equation 6}$$
$$= Vvp + Iload \cdot Rcable$$

Rewriting Equation 6:

$$Vp = \frac{R2}{R1+R2} \cdot Vout + \frac{R1}{R1+R2} \cdot \left(\frac{kR}{R(1+k)} \cdot Iload \cdot Rcable\right)$$
$$= Vvp + Iload \cdot Rcable$$

Simplifying:

$$Vp = \frac{R2}{R1+R2} \cdot Vout + \frac{R1}{R1+R2} \cdot \left(\frac{k}{1+k} \cdot Iload \cdot Rcable\right)$$
$$= Vvp + Iload \cdot Rcable$$

Dropping Vp and setting the solution in terms of Vout:

$$Vout \cdot \frac{R2}{R1+R2} = \quad \text{Equation 7}$$
$$Vvp + Iload \cdot Rcable - \left(\frac{R1}{R1+R2} \cdot \frac{k}{k+1} \cdot Iload \cdot Rcable\right)$$

Now, Rearranging:

$$Vout = Vvp \cdot \frac{R1+R2}{R2} + Iload \cdot Rcable \cdot \frac{R1+R2}{R2} - \quad \text{Equation 8}$$
$$\left(\frac{R1}{R1+R2} \cdot \frac{k}{k+1} \cdot Iload \cdot Rcable\right) \cdot \frac{R1+R2}{R2}$$

or, $$Vout = Vvp \cdot \frac{R1+R2}{R2} + Iload \cdot Rcable \cdot \left(\frac{R1+R2}{R2} - \frac{R1}{R2} \cdot \frac{k}{k+1}\right) \quad \text{Equation 9}$$

Equation 9 now describes the $V_{out}$ voltage inside the base (adapter brick). This voltage, while interesting, is not of primary concern. The voltage at the end of the cable 12 is most important to regulate and the following derivations shown how the compensation is achieved.

Referring again to FIG. 2, the Vout' voltage at the cable end is described by:

$$Vout' = Vload = Vout - (Rcable1 + Rcable2) \cdot Iload \quad \text{Equation 10}$$

Where Rcable1 and Rcable2 are the resistances of each leg of the output cable; now assuming each leg is equal resistance Equation 10 becomes:

$$Vout' = Vload = Vout - (2 \cdot Rcable) \cdot Iload$$

Substituting for Vout from Equation 9 leads to:

$$Vout' = Vload \quad \text{Equation 11}$$
$$= Vvp \cdot \frac{R1+R2}{R2} + Iload \cdot Rcable \cdot$$
$$\left(\frac{R1+R2}{R2} - \frac{R1}{R2} \cdot \frac{k}{k+1}\right) - (2 \cdot Rcable) \cdot Iload$$

And simplifying:

$$Vout' = Vload$$
$$= Vvp \cdot \frac{R1+R2}{R2} + Iload \cdot Rcable \cdot \left[\frac{R1+R2}{R2} - 2 - \left(\frac{R1}{R2} \cdot \frac{k}{k+1}\right)\right]$$

Key observation: If the term inside the brackets can be made to =0, then the effects of Iload and Rcable are eliminated and Vout' becomes independent of cable length and load current. Vvp is independent of load current and only depends on the ratio of Ra and Rb in the tip. For this reason Vvp can be treated as a constant.

Thus, setting the bracketed term=0 and re-arranging the parentheses:

$$0 = \left(\frac{R1+R2}{R2} - 2\right) - \left(\frac{R1}{R2} \cdot \frac{k}{k+1}\right) \quad \text{Equation 12}$$

Re-arranging:

$$\frac{R1+R2}{R2} - 2 = \frac{R1}{R2} \cdot \frac{k}{k+1}$$

Now Euler's method is applied to the left side of the equation:

$$\frac{R1+R2}{R2} \cdot \frac{R2}{R2} - 2 \cdot \frac{R2}{R2}$$

This yields:

$$\frac{(R1+R2) - 2 \cdot R2}{R2}$$

Which is:

$$\frac{R1-R2}{R2}$$

Substituting back into Equation 12 yields:

$$\frac{R1-R2}{R2} = \frac{R1}{R2} \cdot \frac{K}{k+1} \qquad \text{Equation 13}$$

Now multiplying both sides by R2 and moving R1 yields:

$$\frac{R1-R2}{R2} = \frac{k}{k+1} \qquad \text{Equation 14}$$

now solving for k:

$$\frac{R1}{R1-R2} = \frac{k+1}{k} = \frac{k}{k} + \frac{1}{k} = \frac{1}{k} + 1$$

so:

$$\frac{R1}{R1-R2} - 1 = \frac{1}{k}$$

now with an LCD on the left:

$$\frac{R1}{R1-R2} - \frac{R1-R2}{R1-R2} = \frac{R1-R1+R2}{R1-R2} = \frac{1}{k}$$

yielding:

$$k = \frac{R1-R2}{R2} \qquad \text{Equation 15}$$

This k value represents the ratio of the two compensation resistors R and kR shown in FIG. 2. Once R1 and R2 are set, then k can be determined from Equation 15.

As a check this equation for k will be substituted back into Equation 11 to verify the terms go to 0. From Equation 11:

$$Vout' = Vload$$
$$= Vvp \cdot \frac{R1+R2}{R2} + Iload \cdot Rcable \cdot$$
$$\left[ \frac{R1+R2}{R2} - 2 - \left( \frac{R1}{R2} \cdot \frac{k}{k+1} \right) \right]$$

And $$\frac{k}{k+1} = \frac{R1-R2}{R1}$$

from Equation 14. Substituting in Equation 11:

$$Vout' = Vload$$
$$= Vvp \cdot \frac{R1+R2}{R2} + Iload \cdot Rcable \cdot$$
$$\left[ \frac{R1+R2}{R2} - 2 - \left( \frac{R1}{R2} \cdot \frac{R1-R2}{R1} \right) \right]$$

So:

$$Vout' = Vload$$
$$= Vp \cdot \frac{R1+R2}{R2} + Iload \cdot Rcable \cdot \frac{R1+R2-2 \cdot R2 - R1 + R2}{R2}$$

But $$\frac{R1+R2-2 \cdot R2 - R1 + R2}{R2} = 0,$$

so:

$$Vout' = Vload = Vvp \cdot \frac{R1+R2}{R2}$$

and this checks with the original assumption.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A voltage and current programming system for a portable electronic device, comprising:
    a power supply including cable compensation circuitry and adapted to provide a supply output voltage and output current to the portable electronic device;
    a cable adapted to couple the supply output voltage and the output current from the power supply; and
    a tip adapted to couple to the cable, the tip including at least two resistors configured to responsively establish a device output voltage deliverable to the portable electronic device, wherein the cable compensation circuitry comprises a first resistive divide network configured to provide voltage compensation for a voltage drop in the supply output voltage due to the cable.

2. The system of claim 1, wherein the at least two resistors are adapted to establish a voltage reference $V_{sense}$.

3. The system of claim 2, wherein the compensation circuitry generates a first signal as a function of the voltage drop across the cable, receives the voltage reference $V_{sense}$; and establishes the supply output voltage as a function of both the first signal and the voltage reference $V_{sense}$.

4. The system of claim 3, wherein the first signal is a feedback signal.

5. The system of claim 3, wherein the compensation circuitry further comprises a first comparator receiving the first signal and the voltage reference $V_{sense}$.

6. The system of claim 3, wherein the first resistive divide network of the compensation circuitry includes a first resistor and a second resistor, Wherein the first signal is generated by the first resistor coupled to a ground of the power supply, and the second resistor coupled via the cable to an analog ground of the tip.

7. The system of claim 6, wherein the compensation circuitry also comprises a second resistive divide network coupled to the first resistor and second resistor.

8. The system of claim 2, wherein the at least two resistors of the tip are configured to provide the voltage reference $V_{sense}$ and wherein at least one of the at least two resistors conducts a current reference $I_p$.

9. The system of claim 8, wherein the at least two resistors of the tip are serially configured with the voltage reference $V_{sense}$ established at a node therebetween.

10. The system of claim 9, wherein the current reference $I_p$ is provided by the power supply.

11. The system of claim 10, wherein a compensation current $I_p'$ corresponding to the current reference $I_p$ is provided to the compensation circuitry.

12. The system of claim 11, wherein the compensation circuitry includes a current mirror providing both the current reference $I_p$ and the compensation current $I_p'$.

13. The system of claim 12, wherein the current reference $I_p$ and the compensation current $I_p'$ are substantially equal.

14. The system of claim 11, wherein the voltage drop in the supply output voltage due to the cable is compensated by the compensation circuitry without utilizing the at least two resistors of the tip.

* * * * *